Patented Dec. 12, 1950

2,533,660

UNITED STATES PATENT OFFICE 2,533,660

PREPARATION OF CALCIUM PEROXIDE

James H. Young, Niagara Falls, N. Y., assignor to E. I. du Pont de Nemours and Company, Wilmington, Del., a corporation of Delaware No Drawing. Application March 31, 1950, Serial No. 153,295

6 Claims. (Cl. 23—187)

This invention relates to the production of calcium peroxide and more particularly to a method for producing this product in a finely divided, grit-free, stable form.

Of the several methods which have been proposed for the production of calcium peroxide, those involving the addition of calcium hydroxide to hydrogen peroxide, or of sodium peroxide to an aqueous solution of a calcium salt have received most attention. Of these two methods, the latter has been most generally used. The difficulties attending both such methods are in producing a product of a uniformly fine texture having a high active oxygen content and good stability.

One object of the present invention is to provide an improved method for preparing calcium peroxide. A further object is to provide such a method which can be practiced to obtain calcium peroxide hydrate in a readily filterable and washable form, which may be dried readily to produce calcium peroxide having a fine grit-free texture, a high active oxygen content and good stability. These and still further objects will be apparent from the following description of the invention.

I have discovered that in order to obtain calcium peroxide having a high active oxygen content, good stability and a uniform finely divided, grit-free texture it is necessary that the intermediate calcium peroxide hydrate, $CaO_2.8H_2O$, from which the final peroxide is obtained by drying, have a well-developed crystalline structure which permits rapid filtering and washing to remove soluble salts. I have further discovered that in order to obtain the intermediate hydrate in the required form the reaction between the soluble calcium salt and, for example, sodium peroxide must be carried out under very definite reaction conditions. When such conditions are met, calcium peroxide hydrate can be readily obtained in the form of large crystals which can be easily filtered from the reaction medium, easily washed to remove soluble salts and then dried quickly to yield finely divided, grit-free calcium peroxide which has a high active oxygen content and is exceptionally stable.

One of the conditions necessary for the obtainment of calcium peroxide hydrate having the required characteristics is that the reaction must be carried out in a medium whose pH is controlled so as never to be outside the range 9.5 to 11, preferably 10 to 10.5. If the pH, as determined by means of a standard glass electrode using a Beckman pH meter, is permitted to exceed 11, the hydrate intermediate will be contaminated with substantial amounts of coprecipitated calcium hydroxide which hinders the proper crystal development of the hydrate and results in poorer yields. The lower pH limit is not as critical as the higher limit from the standpoint of the physical characteristics of the intermediate hydrate, but it is important from the standpoint of yields since at lower pH values precipitation of the desired hydrate is incomplete.

It is also necessary, in order to obtain hydrate intermediate having the proper physical characteristics, that the reaction medium contain well-formed seed crystals of calcium peroxide hydrate. In a preferred method the reaction is carried out in a medium which is supplied with well-formed seed crystals in an amount corresponding to about 2 to 10% of the weight of the hydrate intermediate to be produced. Seed crystals of large size produce the best results. If desired, the seed crystals can be formed in situ by careful control of the reaction conditions during the early stage of the reaction to permit the formation of well-developed crystals, which crystals then serve as seeds during the remaining stage of the reaction. A more practical procedure is to add to the medium in which the reaction is to be effected, seed crystals of calcium peroxide hydrate from a previous preparation. The presence of well-formed seed crystals during at least about 90% of the reaction period and preferably the entire period is necessary to the obtainment of hydrate intermediate having the desired physical characteristics.

If the required seed crystals are to be formed during the early stage of the reaction, the reaction during such early stage should be carried out slowly so as to provide adequate time for crystals of relatively large size to be formed. This can be accomplished by adding to the reaction medium during the early stage not more than 10% of the amount of materials to be reacted, and this should be accomplished in a period of time not less than 15 minutes. Thereafter, the reactants may be added at considerably faster rates.

A still further condition which must be met in order to obtain hydrate intermediate of the type indicated is that the medium in which the reaction is carried out must contain some free hydrogen peroxide during the entire course of the reaction. The concentration of free hydrogen peroxide in the medium should always be at least 0.1 g. $H_2O_2$ per liter, preferably 0.2 to 0.5 g. per liter. Much larger amounts may be present if desired without harmful effects although ordinarily amounts above about 1 g. per liter do not result in added improvements. However, in instances where the required seed crystals are formed in the reaction medium in the early stage of the reaction, the presence of free hydrogen peroxide in a concentration of about 2 to 4 g. per liter is beneficial during such early stage. Thereafter, concentrations of 0.2 to 0.5 g. per liter are adequate and preferred.

In practice, the above required reaction conditions and the objects of the invention are attained by adding a soluble calcium salt and an alkali metal peroxide, or an alkali metal hydroxide, to a cold agitated aqueous reaction medium which contains at least 0.1 g. per liter of free hydrogen peroxide and well-formed seed crystals of calcium peroxide hydrate. The reactants are added separately and at such rates and relative proportions that the pH of the reaction medium is always maintained within the range 9.5 to 11. If the initial concentration of free hydrogen peroxide in the reaction medium is not sufficiently high to insure a concentration of at least 0.1 g. per liter throughout the entire reaction period, suitable amounts of hydrogen peroxide are added during the course of the reaction so that concentration of hydrogen peroxide will always be at least 0.1 g. per liter.

The invention is further illustrated by the following examples.

*Example 1*

31 grams of a 35%, by weight, aqueous solution of hydrogen peroxide was added to 1660 g. of water cooled to 2° C. While stirring the solution about 32 g. of a solid commercial calcium chloride dihydrate analyzing about 76% $CaCl_2$ and about 18 g. of solid commercial sodium peroxide analyzing about 97% $Na_2O_2$, were added separately and incrementally over a period of about 15 minutes. The rates of addition and proportions of the increments of the reactants added were such that at no time did the pH of the medium to which they were added exceed 11. During this period, which may be termed the seed crystal formation stage, well-formed crystals of calcium peroxide hydrate were produced. After this initial stage, further quantities of solid calcium chloride dihydrate and sodium peroxide were added until totals of 322 g. of the former and 181 g. of the latter had been used. Such additions were made separately and incrementally at rates and proportions so that the pH always was between 9.5 to 11. The total time for all of the additions was about 1 hour and stirring was continued for an additional 15 minutes. The maximum temperature reached was 5° C.

The calcium hydrate crystals formed were filtered and washed until the washings were free of chloride ion as indicated by the silver nitrate test. The original filtrate had a pH of 9.8 measured by a standard glass electrode using a Beckman pH meter and it contained in excess of 0.1 per liter of free hydrogen peroxide. The filtering time was 3 minutes and the time for each of the six washes required was 1 to 2 minutes. The washed crystals were dried on stainless steel trays in an oven at 60° C. for 16 hours in a good stream of air. The dried product analyzed 81% $CaO_2$. It was finely divided and free from gritty particles as determined by the finger rub test.

In the examples shown in the following Table I, Examples 2 and 3 were carried out substantially as described in Example 1 using as the reaction medium 1660 cc. of water to which the amount of hydrogen peroxide indicated had been added before the addition of any of the other reactants. However, instead of involving a seed crystal formation stage, as did Example 1, there was added to the initial reaction media of Examples 2 and 3 about 38 g. of well-formed calcium peroxide hydrate crystals from a previous preparation. Example 4 of the table was carried out employing the old and well-known procedure of adding sodium peroxide to a water solution of calcium chloride. The pH indicated for Example 4 is that of the final reaction mixture and no hydrogen peroxide or seed crystals were added to the solution to which the sodium peroxide was added. In other respects, such as the reaction temperature, reaction time, and type of agitation, the reaction conditions for Example 4 were substantially the same as for the other examples.

*Table I*

| Example | Grams of Reactants | | | pH | Filt. Time, Min. | Wash Time, Min. | Product | | |
|---|---|---|---|---|---|---|---|---|---|
| | 76% $CaCl_2$ | 97% $Na_2O_2$ | 35% $H_2O_2$ | | | | $CaO_2$, Percent | Act. O Yield, Percent | Texture |
| 2 | 322 | 166 | 31 | 9.4–10 | 2 | 7 | 80.8 | 78 | Fine, grit-free. |
| 3 | 322 | 166 | 31 | 9.5–10.3 | 4 | 10 | 80.9 | 77 | Do. |
| 4 | 322 | 200 | 0 | 12 | 15 | 120 | 77.4 | 70 | Coarse, gritty. |

The time required to filter and wash the calcium peroxide hydrate in Example 4 was much longer than the corresponding times for Examples 2 and 3. Furthermore, the final product in Example 4 was coarse and gritty to the feel whereas fine textured products entirely free from grit were obtained in the other examples.

Examples 2 and 3 have been duplicated on a large scale employing 500 lbs. of calcium chloride dihydrate, from 275 to 279 lbs. of about 97% sodium peroxide and 16 to 25 lbs. of 35% hydrogen peroxide, the latter being added to 200 gallons of water used as the reaction medium. In all cases, a fine-textured grit-free product was obtained. No difficulty was experienced in obtaining product analyzing from 78 to about 82% $CaO_2$, whereas when practicing the method of Example 4, the resulting gritty coarse product frequently contained less than 75% $CaO_2$.

One distinct advantage resulting from the present method is that the calcium peroxide hydrate intermediate obtained dries very readily. With product prepared by the present method the drying capacity of a commercial drier operated batchwise on an 11 hour cycle with a given flow rate of drying air at 130° C. was found to be 250 lbs. of dry product. The capacity of the drier operated under the same conditions was only 160 lbs. when drying material produced by the old method of adding sodium peroxide to a calcium chloride solution. Thus, the drying capacity of the drier was 56% greater for product prepared by the present method.

The results shown in Table 2 demonstrate improvements in particle size distribution, texture and stability of product prepared by the present method as compared with product prepared by a prior method. The products of Examples 5, 6, 7 and 8 were prepared by the present method, employing the procedure described for Examples 2 and 3. The product of Example 9 was obtained by reacting sodium peroxide with calcium chloride in substantially molar proportions, employing the procedure described for Example 4. The reaction temperatures were substantially the same in all cases and in each example the intermediate calcium peroxide hydrate was filtered out, washed until free of chlorides and then dried with hot air in the conventional manner.

*Table 2*

| Example | Product | | Residues on Screens of | | | Percent Orig. Act. O lost per mo. at 50° C. |
|---|---|---|---|---|---|---|
| | Per cent $CaO_2$ | Texture | 100 Mesh | 200 Mesh | 325 Mesh | |
| PRODUCT FROM NEW PROCESS | | | | | | |
| 5 | 81.5 | Fine, grit-free | 0 | 0 | 0 | 0.5 |
| 6 | 80.9 | do | 0 | 0 | 0 | |
| 7 | 80.7 | do | 0 | 0 | 0 | |
| 8 | 81.9 | do | 0 | 0.1 | 0.2 | 1.3 |
| PRODUCT FROM OLD PROCESS | | | | | | |
| 9 | 72.6 | Coarse, gritty | 17.6 | 3.8 | 10.6 | 10.7 |

It is of course well known that in reactions of the present type a combination of hydrogen peroxide with sodium hydroxide in a 1:2 mole proportion is the full equivalent of sodium peroxide. Accordingly, while the use of an alkali metal peroxide, such as sodium peroxide, is preferred as one of the reactants which is added separately to the reaction medium, a combination of hydrogen peroxide with an alkali metal hydroxide in the proportion indicated may be employed in place of all or part of the alkali metal peroxide. If such a combination is used, the hydroxide should of course be added separately from the calcium salt in order to permit control of the pH as required. The hydrogen peroxide may also be added separately, i. e. separate from both the sodium hydroxide and the calcium salt; but if desired it may be added admixed with solutions of either the calcium salt or the sodium hydroxide, or all or part of it may be added to the water to which the other reactants are subsequently separately added. In any case, the amounts of sodium peroxide and/or hydrogen peroxide used should supply at least 1 atom of active oxygen per mole of calcium salt, aside from the small amount of hydrogen peroxide required to maintain the minimum concentration of free hydrogen peroxide in the reaction medium. Ordinarily the total active oxygen supplied will be not more than about 1.2 atoms nor less than 1 atom (plus the amount required for the minimum $H_2O_2$ concentration) per mole of calcium salt. Larger amounts may be used but would be wasteful.

The separate additions of the reactants may be continuous or discontinuous so long as they do not cause the pH of the reaction medium to fall outside of the range indicated. Also, the reaction may be carried out batchwise or continuously. Thus, in the continuous method, the separate additions of the reactants may be made continuously to the agitated reaction medium along with a suitable amount of water which contains a suitable concentration of hydrogen peroxide, while a slurry of the calcium peroxide hydrate is continuously withdrawn from the reaction medium at a rate corresponding to the rate at which materials are being added.

The reactants such as the calcium salt and alkali metal peroxide, or hydroxide, may be added either as water solutions or as solids. The addition of solid calcium chloride and solid sodium peroxide gives good results and is preferred. The amount of water employed in the reaction medium, part of which may be supplied along with the reactants during the course of the reaction, is not critical but should be sufficient to permit effective agitation and temperature control. Usually about 0.6 to 1.5 liters will be used per mole of calcium salt being reacted. As in prior methods, the reaction medium should be cooled and temperatures of about 10° C. or lower are satisfactory. The intermediate hydrate is dried following any of the known procedures. The use of dry air at 60 to 150° C. is satisfactory. With dry air at about 130° C. the drying time is usually 4 to 6 hours. A drum drier operated at about 130 to 150° C. can be used with satisfactory results.

Any water soluble calcium salt such as calcium chloride, calcium nitrate or calcium acetate, and any alkali metal peroxide, or alkali metal hydroxide in combination with hydrogen peroxide, may be used. Calcium chloride and sodium peroxide are preferred. Any commercial hydrogen peroxide is suitable for addition to the reaction medium. All materials used should, of course, be as free as possible from impurities, such as heavy metal constituents, which catalyze the decomposition of peroxygen compounds.

The present process produces relatively large crystals of calcium peroxide hydrate which filter and wash readily and absorb relatively small quantities of water. Because of the small amount of water held by the crystals they dry without melting. Surprisingly, during drying, these pure large hydrate crystals decrepitate and produce very fine and uniform grit-free particles. In contrast, most prior art methods produce small contaminated hydrate crystals which imbibe large amounts of water and melt at the drying temperatures before adequate drying can be accomplished. The resulting calcium peroxide product includes coarse particles which are hard and gritty and contains substantial amounts of material which does not readily disperse. When used, for example in conditioning bread dough, the product of the present method is readily dispersed in the bread batch and reacts readily and completely to give up all of its active oxygen in the manner desired. In contrast, products prepared by prior methods react relatively slowly and frequently leave undesirable unreacted particles in the bread.

A convenient method of comparing particle size of calcium peroxide products is to disperse 5 g. of the material by good agitation in an excess of water and then screen the slurry through suitable sieves, preferably of stainless steel. This wet method was employed in obtaining the screen analysis data reported in Table 2. As there shown, product produced by the present method is free of materials which would be retained on a 100 or 200 mesh screen and contains less than 2%, and generally less than 1%, of material which is retained on a 325 mesh screen.

Because of the excellent physical characteristics and stability of products made by the present method, such products are particularly well suited for use, for example for improving the characteristics of bread dough, in chewing gum compositions and in other applications where calcium peroxide has found use.

I claim:

1. A method for producing calcium peroxide comprising adding separately (a) a soluble calcium salt and (b) a material from the group consisting of alkali metal peroxides and alkali metal hydroxides, to a cold agitated aqueous reaction medium at such rates and in such relative proportions as will maintain the pH of said medium within the range 9.5 to 11, said medium containing seed crystals of calcium peroxide hydrate and also free hydrogen peroxide in a concentration of at least 0.1 gram $H_2O_2$ per liter during the course of the reaction, separating the resulting calcium peroxide hydrate and drying it.

2. The method of claim 1 wherein (b) is sodium peroxide.

3. The method of claim 1 wherein (a) is calcium chloride and (b) is sodium peroxide.

4. The method of claim 1 wherein the concentration of free hydrogen peroxide in the reaction medium is 0.2 to 0.5 gram $H_2O_2$ per liter.

5. A method for producing calcium peroxide comprising adding separately solid calcium chloride and solid sodium peroxide to a cold agitated water solution of hydrogen peroxide in which the $H_2O_2$ concentration is 2 to 4 grams per liter, said additions being made at such rates and relative proportions that the pH of the resulting mixture is always within the range 9.5 to 11 and being continued for a time not less than 15 minutes within which time not more than 10% of the total amounts of calcium chloride and sodium peroxide to be reacted have been added, whereby the formation in said mixture of large crystals of calcium peroxide hydrate is facilitated, thereafter completing the separate additions of said calcium chloride and sodium peroxide at faster rates but in such relative proportions that the pH of the resulting mixture is always within the range 9.5 to 11, while maintaining in said last named mixture a concentration of free hydrogen peroxide of 0.1 to 0.5 gram $H_2O_2$ per liter; separating the resulting calcium peroxide hydrate and drying it.

6. A method for producing calcium peroxide comprising separately adding solid calcium chloride and sodium peroxide to a cold agitated reaction medium comprising essentially water, free hydrogen peroxide in an amount equal to 0.2 to 0.5 gram $H_2O_2$ per liter of said medium and preformed crystals of calcium peroxide hydrate in an amount corresponding to about 2 to 10% of the weight of the theoretical yield of calcium peroxide hydrate, said additions being made at such rates and relative proportions that the pH of said medium is always within the range 9.5 to 11, separating the resulting calcium peroxide hydrate and drying it.

JAMES H. YOUNG.

No references cited.